United States Patent [19]

Kataoka

[11] Patent Number: 5,355,232
[45] Date of Patent: Oct. 11, 1994

[54] IMAGE SIZE CHANGE IN CONJUNCTION WITH CODING AND DECODING

[75] Inventor: Tatsuhito Kataoka, Tokyo, Japan

[73] Assignee: Canon Kabushiki Kaisha, Tokyo, Japan

[21] Appl. No.: 743,019

[22] Filed: Aug. 9, 1991

[30] Foreign Application Priority Data

Aug. 13, 1990 [JP] Japan .................................. 2-211573

[51] Int. Cl.$^5$ .............................................. H04N 1/04
[52] U.S. Cl. .................. 358/451; 358/261.1
[58] Field of Search .................. 358/451, 426–427, 358/432–433, 261.1–261.4

[56] References Cited

U.S. PATENT DOCUMENTS

4,536,802  8/1985  Kurata ................................. 358/451
4,958,237  9/1990  Kubota ................................. 358/451

*Primary Examiner*—Stephen Brinich
*Attorney, Agent, or Firm*—Fitzpatrick, Cella, Harper & Scinto

[57] ABSTRACT

An image processing method and apparatus in which image data is divided into blocks each containing a plurality of pixels and is coded and decoded on the basis of such blocks. When the image data is enlarged or reduced, enlargement is conducted before the coding and decoding, while reduction is performed after coding and decoding, whereby quantization errors caused by the coding and decoding is minimized.

15 Claims, 9 Drawing Sheets

IMAGE SIZE CHANGE IN CONJUNCTION WITH CODING AND DECODING

BACKGROUND OF THE INVENTION

1. Field of the Invention

The present invention relates to a method of and an apparatus for processing an image and, more particularly, to image processing method and apparatus in which coding and decoding of the image data are conducted on the basis of such blocks.

2. Description of the Related Art

Apparatus has been known in which image data read by an image reading device is delivered to an image output device such as a printer, e.g., a laser beam printer (LBP), which prints the image. In this type of apparatus, it is a common measure to temporarily store the read image data in an image memory when the image reading operation performed by the image reading device and the output operation by the image output device cannot be executed in real time. In order to improve the storage efficiency of the memory, it has been proposed to code the image data to be stored in the image memory so as to reduce the quantity of data, particularly when the quantity of the image data is large as is the case of color image data.

When the image data is to be enlarged or reduced, the enlarging or reducing operation is conducted in a batch manner before the coding of the image data or after decoding of the coded image data because enlargement or reduction of coded image data is very difficult to conduct.

Enlargement or reduction, conducted in a batch manner before coding or after decoding, poses a problem in that quantization errors due to coding or decoding are increased when the image is enlarged or reduced, especially in a case of using a non-reversible encoding method. For instance, when a reduction of image data is conducted prior to coding/decoding, the quantity of the image data is decreased so that quantization errors are increased.

SUMMARY OF THE INVENTION

An object of the present invention is to provide image processing method and apparatus which can reduce quantization error caused by coding/decoding of image data when the image data is to be enlarged or reduced, thereby overcoming the above-described problem of the known art.

Another object of the present invention is to provide a high-speed copying apparatus.

Still another object of the present invention is to obtain an image reproduced with high quality.

Another object of the present invention is to reduce a capacity of image memory in a copying apparatus. According to the present invention, these objects are attained by an image processing apparatus and method in which image data is divided into blocks each containing multiple pixels, and is coded and decoded on the basis of the blocks. Image enlargement, if any, is performed before coding and decoding, and image reduction, if any, is performed after coding and decoding.

Other objects, features and advantages of the present invention will become clear from the following description taken in conjunction with the accompanying drawings.

DESCRIPTION OF THE PREFERRED EMBODIMENT

The preferred embodiment of the present invention will be described in detail with reference to the accompanying drawings.

Figure 1A:
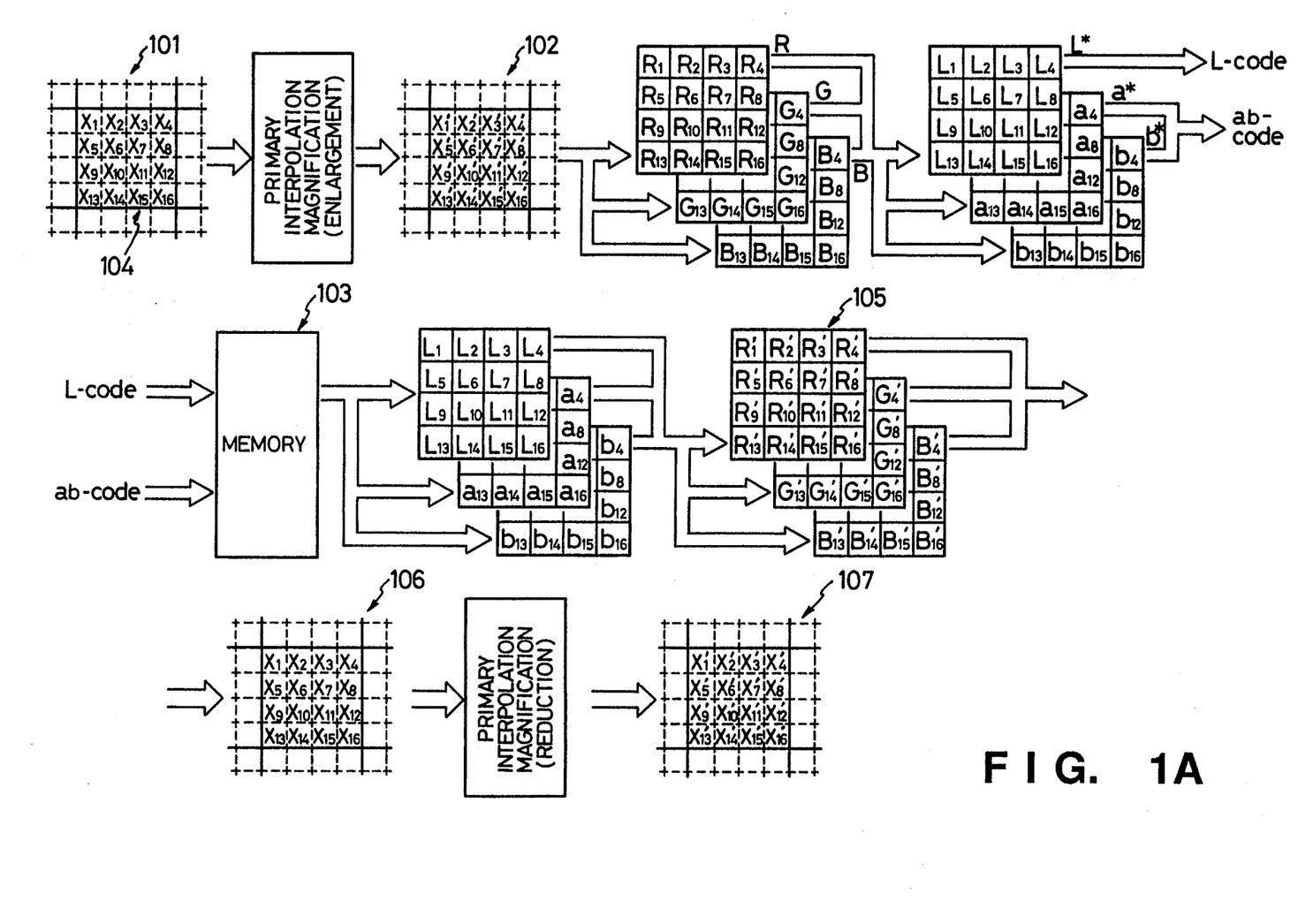
FIG. 1A is an illustration of an image processing operation conducted in accordance with the present invention.

FIG. 1A shows the flow of coding and decoding processings in the embodiment of the present invention. The embodiment which will be described hereinbelow is constructed such that enlargement and reduction of image data, when they are necessary, are performed before coding and after decoding, respectively.

Referring to FIG. 1A, numeral 101 denotes an original image and 102 denotes an original image after primary interpolation (enlargement). A pixel block 104 contains, for example, 16 pixels $X_1$ to $X_{16}$ which are arranged in four lines and four columns. The original image 101 is read by, for example, a CCD device. Data from each pixel is decomposed into three color components. For instance, data from the pixel $X_1$ is decomposed into three primary color components $R_1$, $G_1$ and $B_1$. Data from the pixel $X_2$ is divided into color components $R_2$, $G_2$ and $B_2$. Similarly, the data from pixel $X_{16}$ is decomposed into components $R_{16}$, $G_{16}$ and $B_{16}$. For the sake of convenience in color information processing, the R, G and B data are converted into, for example, lightness index L* of the CIE L*a*b* color specification system and chromaticity indices a*, b* The conversion is conducted, for example, in accordance with the following formula (1):

$$\begin{bmatrix} L^* \\ a^* \\ b^* \end{bmatrix} = \begin{bmatrix} 0 & 116 & 0 & -16 \\ 500 & -500 & 0 & 0 \\ 0 & 200 & -200 & 0 \end{bmatrix} \begin{bmatrix} X/X_0 \\ Y/Y_0 \\ Z/Z_0 \\ I \end{bmatrix} \quad (1)$$

where $$\begin{bmatrix} X \\ Y \\ Z \end{bmatrix} = \begin{bmatrix} 0.40 & 0.31 & 0.20 \\ 0.18 & 0.81 & 0.11 \\ 0.00 & 0.10 & 0.99 \end{bmatrix} \begin{bmatrix} R \\ G \\ B \end{bmatrix}$$

-continued $$\begin{bmatrix} X_0 \\ Y_0 \\ Z_0 \end{bmatrix} : \text{constants of standard three stimulus values}$$

The block L* ($L_1$ to $L_{16}$) of the lightness data thus obtained is coded into final L-code, while the blocks a* ($a_1$ to $a_{16}$) and b* ($b_1$ to $b_{16}$) of the chromaticity data are sequentially and synthetically coded through a plurality of steps so as to become final ab-code.

Figure 1B:
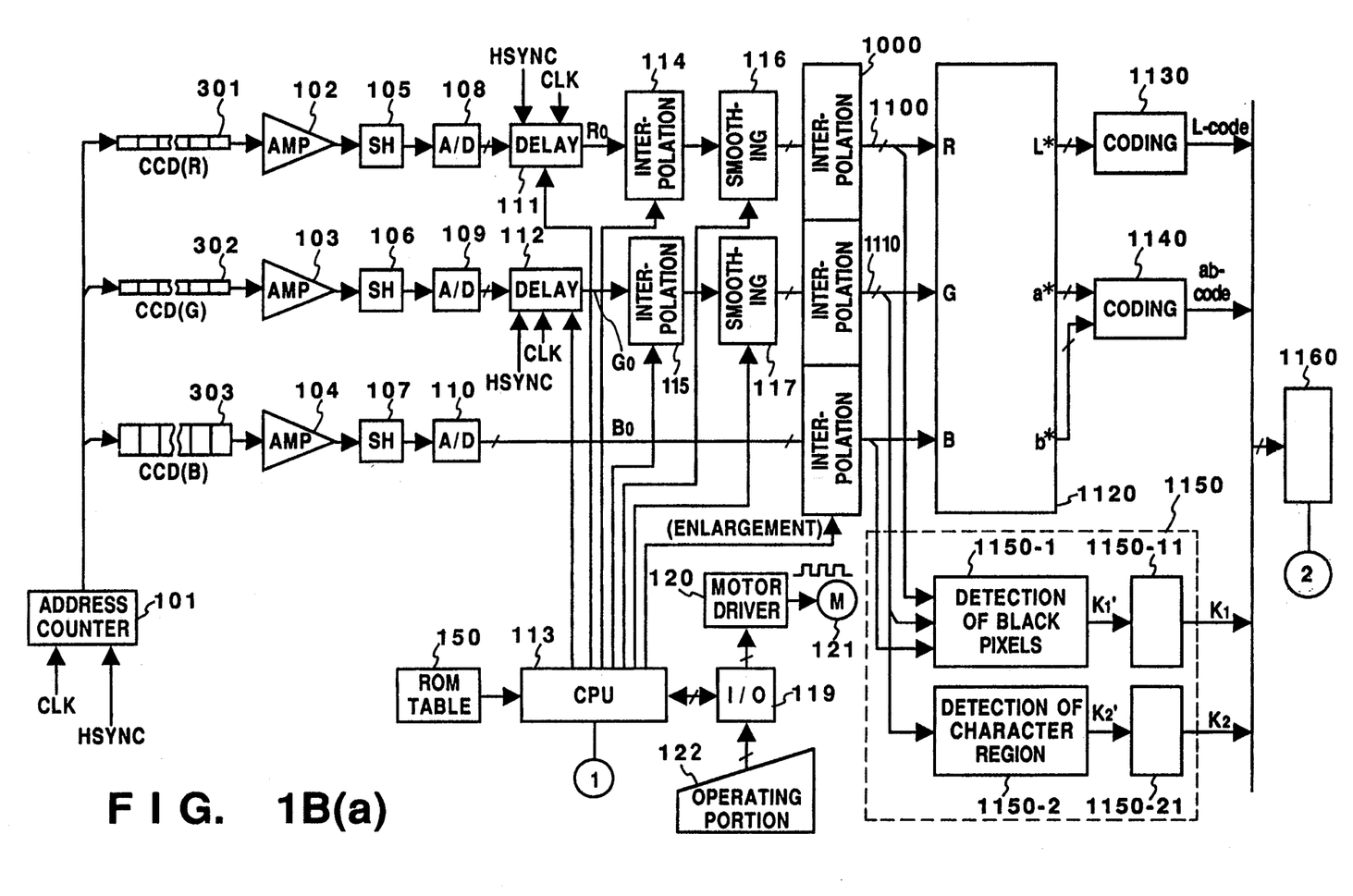
FIG. 1B consisting of FIGS. 1B($a$) and 1B($b$), is a block diagram of a copying apparatus constructed in accordance with the present invention.

FIG. 1B is a block diagram showing the whole construction of a copying apparatus embodying the present invention.

Referring to this Figure, numeral 113 denotes a CPU which controls the whole apparatus. Information such as magnification is input to the CPU 113 from an operation portion 122 through an I/O port 119. The term "magnification" is used in this specification to cover both enlargement and reduction of image. The operation portion 122 then operates to set predetermined data in accordance with the input information and the motor driver 120 operates to deliver to a motor 121 a drive signal corresponding to the magnification, thereby causing a reading system to scan an original at a desired reading speed.

Symbol HSYNC represents a synchronizing signal used in the min scan for reading, while CLK represents a transfer clock signal used in transferring image data. An address counter 101 delivers reading addresses to three line sensors CCD(R) 301, CCD(G)302 and CCD(B)303. The images read by the CCDs 301, 302 and 303 are amplified by the respective amplifiers 102, 103, 104 and are picked up as digital signals through sample hold circuits 105, 106, 107 and A/D converters 108, 109 and 110. Delay elements 111 and 112, which are constituted by fast-in fast-out memory elements (referred to as "FIFO", hereinafter), function to adjust time offsets or delays of data between three CCD lines in accordance with reading magnifications.

Numeral 150 designates a ROM table which stores a plurality of groups of data to be set in respective units for a plurality of magnifications. Interpolation circuits 114, 115 and smoothing circuits 116, 117 are incorporated for the purpose of correcting any phase difference of amount below one line of main scan and for the purpose of effecting compensation for any difference in space frequency characteristics. Magnification in the direction of sub-scan is conducted by the means described above. It is assumed here that both enlargement and reduction in the direction of sub-scan are performed before the coding of the image data.

Numeral 1120 designates a color space converter which converts R, G and B signals into lightness L*, chromaticity a* and chromaticity b*. The signals L*, a* and b* are further converted into L-code and ab-code by encoders 1130 and 1140.

A characteristic extracting circuit 1150 shown in FIG. 1B is composed of a plurality of circuits: namely, a black pixel detecting circuit 1150-1 which produces a judgement signal $K_1'$ indicative of whether a pixel in question is a black pixel, a 4×4 area processing circuit 1150-11 which, upon receipt of the signal $K_1'$, a signal $K_1$ indicative of whether the area of a 4×4 pixel block is a black pixel area, a character pixel detecting circuit 1150-2 which produces a judgment signal $K_2'$ as to whether the pixel in question is a pixel of a character, and another 4×4 area processing circuit 1150-21 which, upon receipt of the signal $K_2'$, a signal $K_2$ indicative of whether the area in the 4×4 pixel block is a character pixel area.

The details of constructions of the black pixel detecting circuit 1150-1 and the character pixel detecting circuit 1150-2, as well as the criterion used for determination in these circuits, are described in, for example, Japanese Patent Application No. 1-200473.

A memory 1160 stores the L-code signal which is coded lightness information, ab-code signal which is coded chromaticity information, and judgment signals $K_1$ and $K_2$ which are obtained as results of extraction of characteristics.

Numerals 1410, 1420, 1430 and 1440 denote density signal generating means for magenta (M), cyan (C), yellow (Y) and black (Bk) colors. These density signal generating means have almost the same construction.

Lightness information decoders denoted by 1170, 1170', 1170" and 1170'" decode the L* signal in accordance with the L-code signals. Chromaticity decoders 1180, 1180', 1180" and 1180'" decode a* and b* signals in accordance with the ab-code signals. Color converters 1180, 1180', 1180" and 1180'" convert the decoded L*, a* and b* signals into corresponding color signals R, G or B and further convert the thus obtained color signals into color components magenta (M), cyan (C), yellow (Y) and black (Bk) for development with toners.

Numerals 1200, 1200', 1200" and 1200'" denote density converters. Numerals 1210, 1210', 1210" and 1210'" denote space filters which form smoothing filters for noncharacter regions while forming edge stressing filters for character regions, thereby simultaneously effecting removal of noises from the image and sharpening of the character images. Numerals 1220, 1220', 1220" and 1220'" designate pixel correction means which conduct necessary correction in the decoded image data.

Numerals 1000, 1000', 1000" and 1000'" denote circuits for effecting interpolation magnification in the direction of main scan.

Figure 1C:
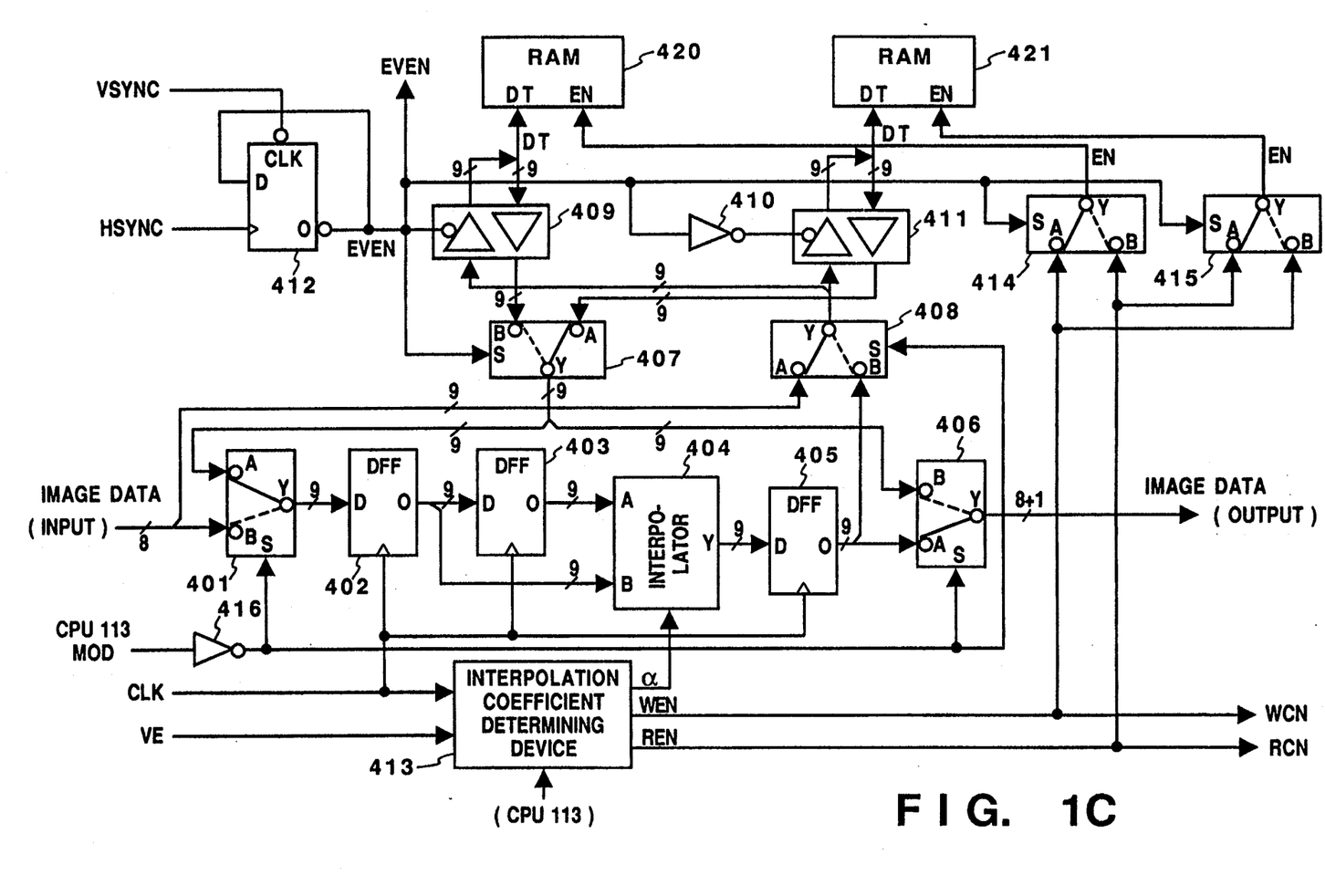
FIG. 1C is a block diagram explanatory of interpolation magnification performed in accordance with the present invention.

FIG. 1C is a block diagram of a circuit for performing the interpolation magnification, i.e., enlargement and reduction by interpolation. Symbols VSYNC and HSYNC respectively represent synchronizing signals for scanning in sub-scan direction and main-scan direction, respectively. CLK represents pixel clock signals, while VE represents a signal which indicates the effective region of image in the main-scan direction.

Numerals 401, 406, 407 and 408 denote 8-bit selectors. Each selector selects and outputs the signal on an input line A when the logical level of a signal received at the input terminal S is "0", whereas, when the logical level is "1", it selects and outputs a signal on an input line B. 1-bit selectors 414, 415 operate in the same manner as the above-mentioned 8-bit selectors, in accordance with the logical level of the signal received by the input terminals S. Numerals 402, 403 and 405 denote 9-bit D-type flip-flops (referred to as "DFF"). Each DFF latches data input thereto at the rise of each clock signal CLK. An interpolator 404 performs a linear interpolation of data between two successive pieces of image data including EDG data, by using an interpolation factor $\alpha$. An interpolation factor determining device 413 produces information concerning the interpolation factor $\alpha$ (0 to 15) in accordance with parameter information corresponding to the magnification information m (%) given by the CPU 113.

The interpolation factor determining device 413 also controls the updating of the address data (writing address and reading address) generated from an address controller which is not shown.

Numerals 409 and 411 denote bi-directional buffers, 410 and 416 denote inverters, and 412 denotes a DFF which forms a 1-bit counter.

In operation of this circuit, DFF 412 is reset by the synchronizing signal VSYNC and, thereafter, the logical level of the output from the DFF 412 is inverted in response to each synchronizing signal HSYNC. Thus, image on an odd-number line of the original is read by the CCD when the logical level of EVEN signal is "0". The read data is written in the RAM 309. Meanwhile, image data which was read from an even-number line of the original immediately before the reading of the above-mentioned odd-line image data and which has been stored in the RAM 310 is read out from the latter. Similarly, when the EVEN signal is at the logical level "1", the CCD reads image from an even-number line of the image. The thus read image is written in a RAM 421, while the image data from an odd-number line which was read immediately before the reading of the image data from the above-mentioned even-number line is read from the RAM 421.

The CPU 311 delivers a MOD signal in accordance with the degree of magnification required. The signal MOD takes logical "1" level when the required magnification is to enlarge the image size (m > 100) and logical level "0" when a reduction or real-size imaging (m is equal to or smaller than 100).

A description will now be given of other flows of process, on an assumption that the existing magnification demand is for enlarging the size of the image.

When an enlargement demand exists, the image data read by CCD is delivered to bi-directional buffers 409 and 411 through the selector 408. Therefore, image data read from an odd-number line is written in the RAM 420 through the bi-directional buffer 409, whereas image data read from an even-number line is written in the RAM 421 through the bi-directional buffer 411. Input image data are written in the RAM 420 or 421 without any change.

The image data written in the RAM 420 or 421 is read through the selector 407 while being enlarged at the magnification m(%) and the enlarged image data is then interpolated through the interpolator 404 and then output from the selector 406.

A description will now be given of the flow of image data when the magnification demand is to produce a reduced or real size image. In this case, the image data read by the CCD is thinned out at a ratio corresponding to the appointed magnification (reduction) m (%) and is interpolated by the interpolator. The reduced image data after interpolation is then stored in the RAM 420 when the data is from an odd-number line and in the RAM 421 when the image data is from an even-number line.

The image data written in the RAM 420 or 421 is read through the selector 407 and output from the selector 406.

Figure 2:
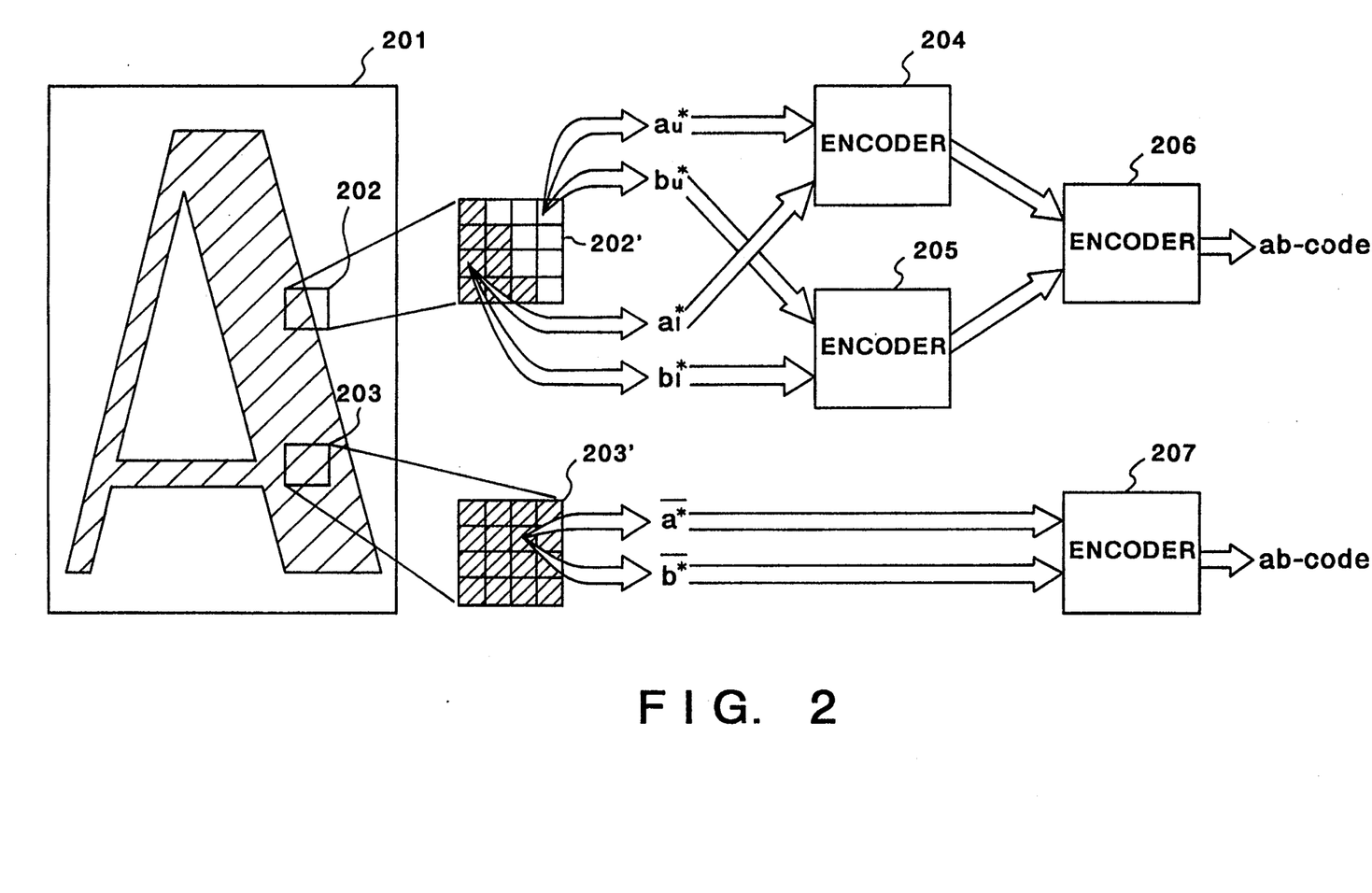
FIG. 2 is a flowchart showing the flow of a coding processing conducted in an embodiment of the present invention.

FIG. 2 is an illustration of a practical example of coding operation performed in the described embodiment. In this Figure, numeral 201 denotes a color original, while 202 and 203 denote pixel blocks. Numeral 202' represents the pixel block 202 shown in greater scale. As will be seen from this Figure, the pixel block 202 (202') includes an edge portion. Numeral 203' represents the pixel block 203 shown in a greater scale. It will be seen that the pixel block 203 (203') does not include any edge portion. In regard to this "flat" pixel block, mean values a* and b* of the pixel chromaticity data (a*, b*) are determined and the color of the pixel block 203' is represented by the block mean value (a*, b*). The encoder 207 synthetically encodes the block mean value (a*, b*) to produce the final ab-code.

Coding of the block 202' having an edge requires that data for two colors are retained. In this case, a first point at which the lightness data L* is greatest and a second point at which the lightness data L* is smallest are selected in this block. The pixel block 202' is represented by the chromaticity data ($a_u$*, $b_u$*) at the first point where the lightness data L* is greatest and the chromaticity data ($a_1$*, $b_1$*) at the second point where the lightness data L* is smallest.

Figure 3A:
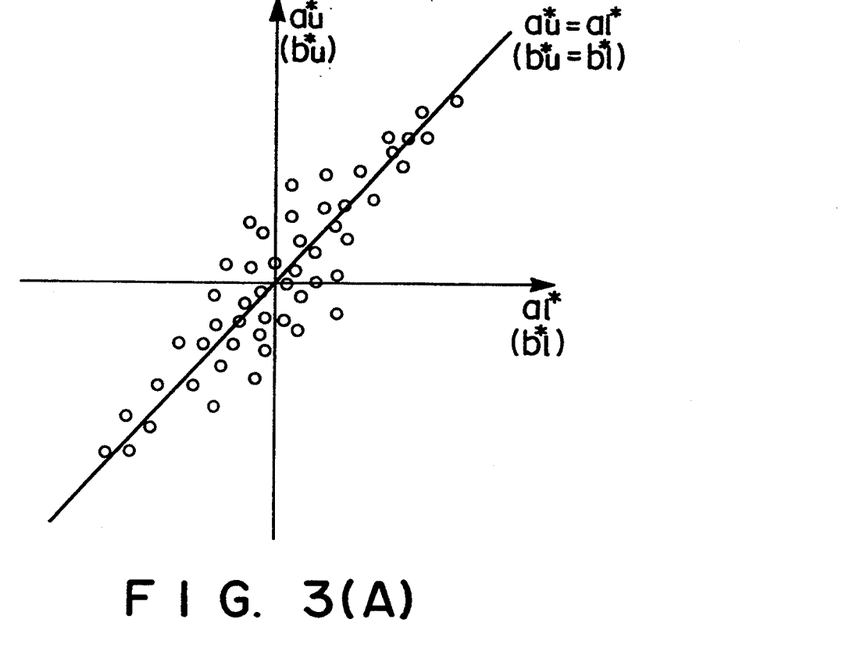
FIGS. 3A and 3B are diagrams showing correlation between chromaticity data a* and b* obtained from a color original.
Figure 3B:
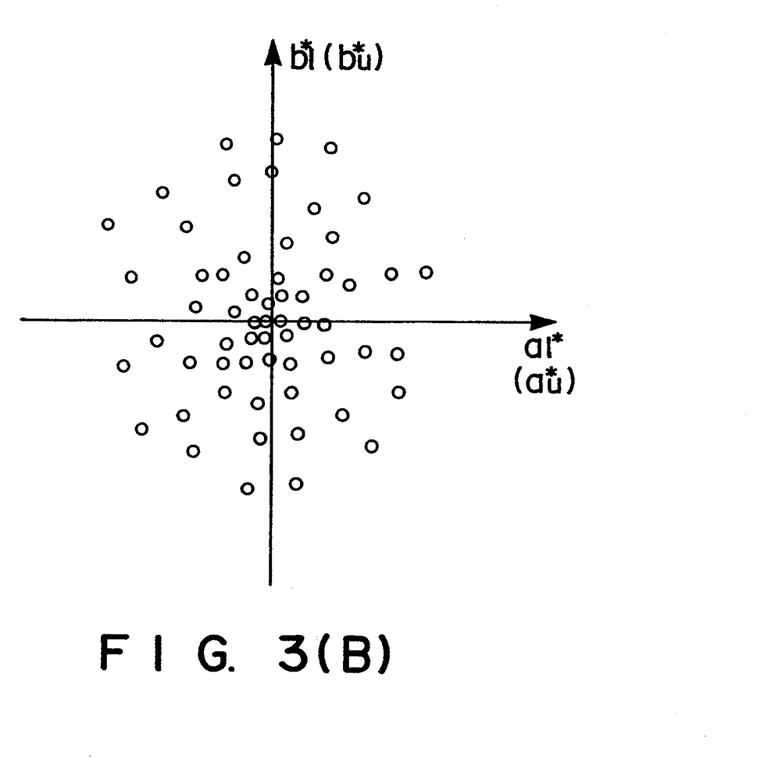

FIGS. 3A and 3B are diagrams showing correlation between chromaticity data a* and b* as obtained with the color original 201. More specifically, FIG. 3A shows the correlation between $a_1$* and $a_u$* or between $b_1$* and $b_u$*, while FIG. 3B shows the correlation between $a_1$* and $b_1$* or between $a_u$* And $b_u$*. As will be understood from FIG. 3A, a close correlation exists between $a_1$* and $a_u$* or between $b_1$* and $b_u$*. However, as will be seen from FIG. 3B, there is no correlation between $a_1$* and $b_1$* or between $a_u$* and $b_u$*. Synthetic coding (quantization) of pieces of data which do not have any correlation to each other increases coding error. If such coding is conducted over a plurality of stages, coding error will be multiplexed to produce an undesirable result.

Conversely, synthetic coding of pieces of data having close correlation does not produce significant coding error. When the coding is conducted in a plurality of stages, cumulative error can be reduced to minimize the total coding error if the synthetic coding is commenced with the pieces of data having close correlation.

Referring again to FIG. 2, the encoder 204 first conducts synthetic coding of chromaticity data $a_u$* and $a_1$* which have close correlation to each other. Similarly, the encoder 205 synthetically codes the chromaticity data $b_u$* and $b_1$*. Subsequently, the encoder 206 conducts a synthetic coding of the output codes of the encoders 204 and 205, thus producing the final ab-code.

Figure 4:
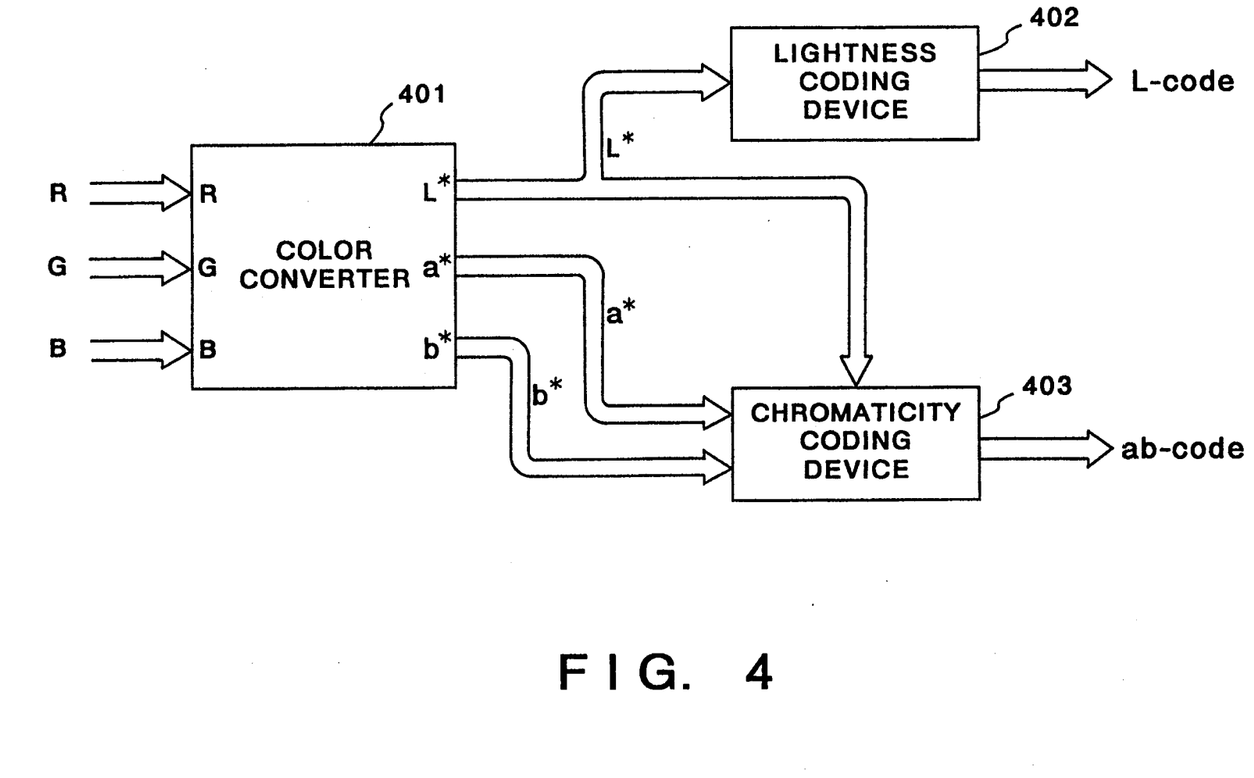
FIG. 4 is a schematic block diagram showing the construction of a color image coding device used in the embodiment of the present invention.

FIG. 4 is a schematic block diagram showing the color image coding device used in the described embodiment. In this Figure, a color converter 401 receives R, G and B color data and convert then into lightness data L* and chromaticity data a*, b* of CIE1976 L*a*b* color specification system. A lightness coding device 402 encodes the lightness data L* into L-code. A chromaticity coding device 403 synthesizes the lightness data L* and the chromaticity data a*, b* and encodes them into the final ab-code.

Figure 5A:
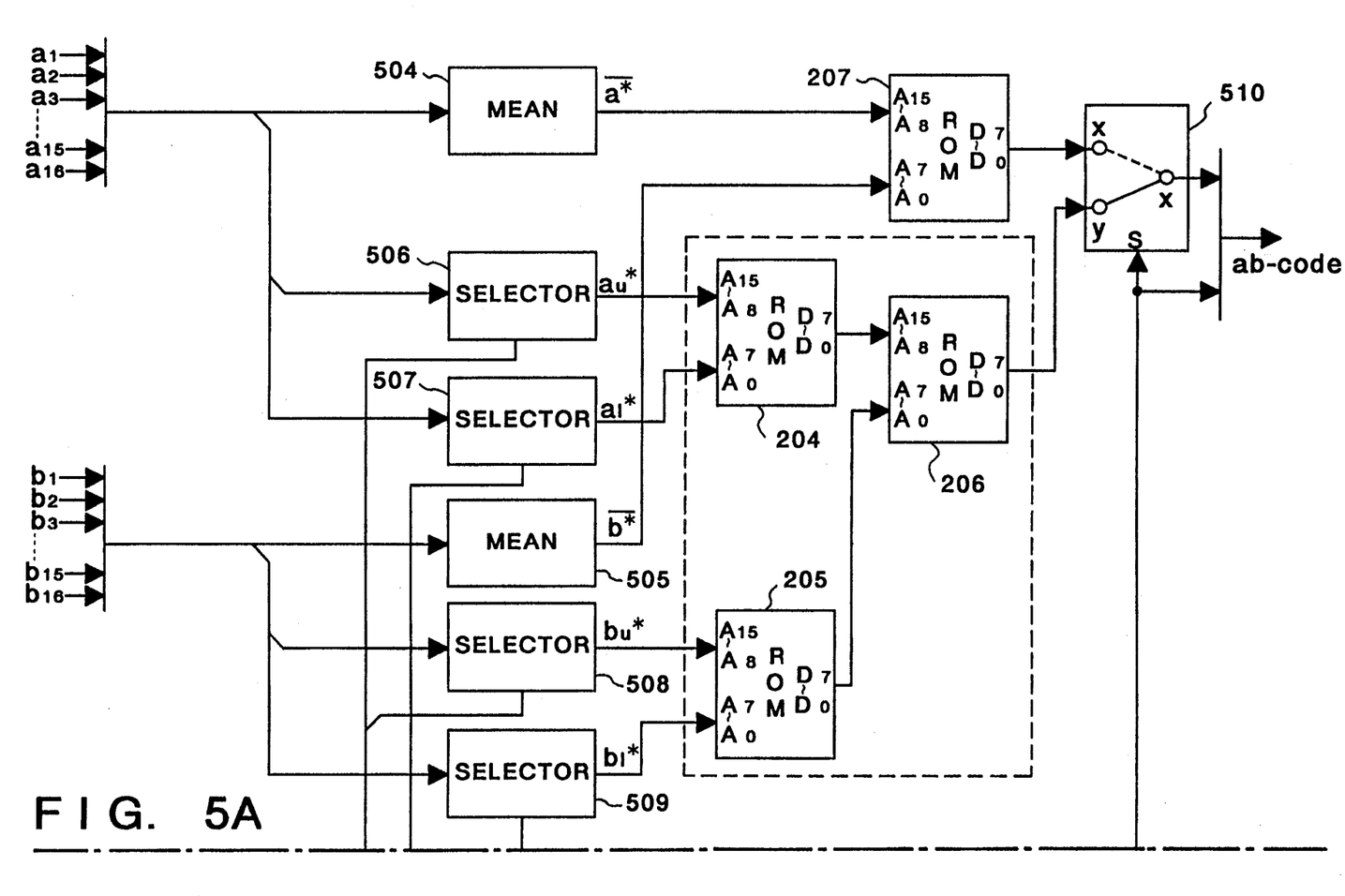
FIGS. 5A and 5B are block diagrams of a chromaticity encoder used in the embodiment of the present invention.
Figure 5B:
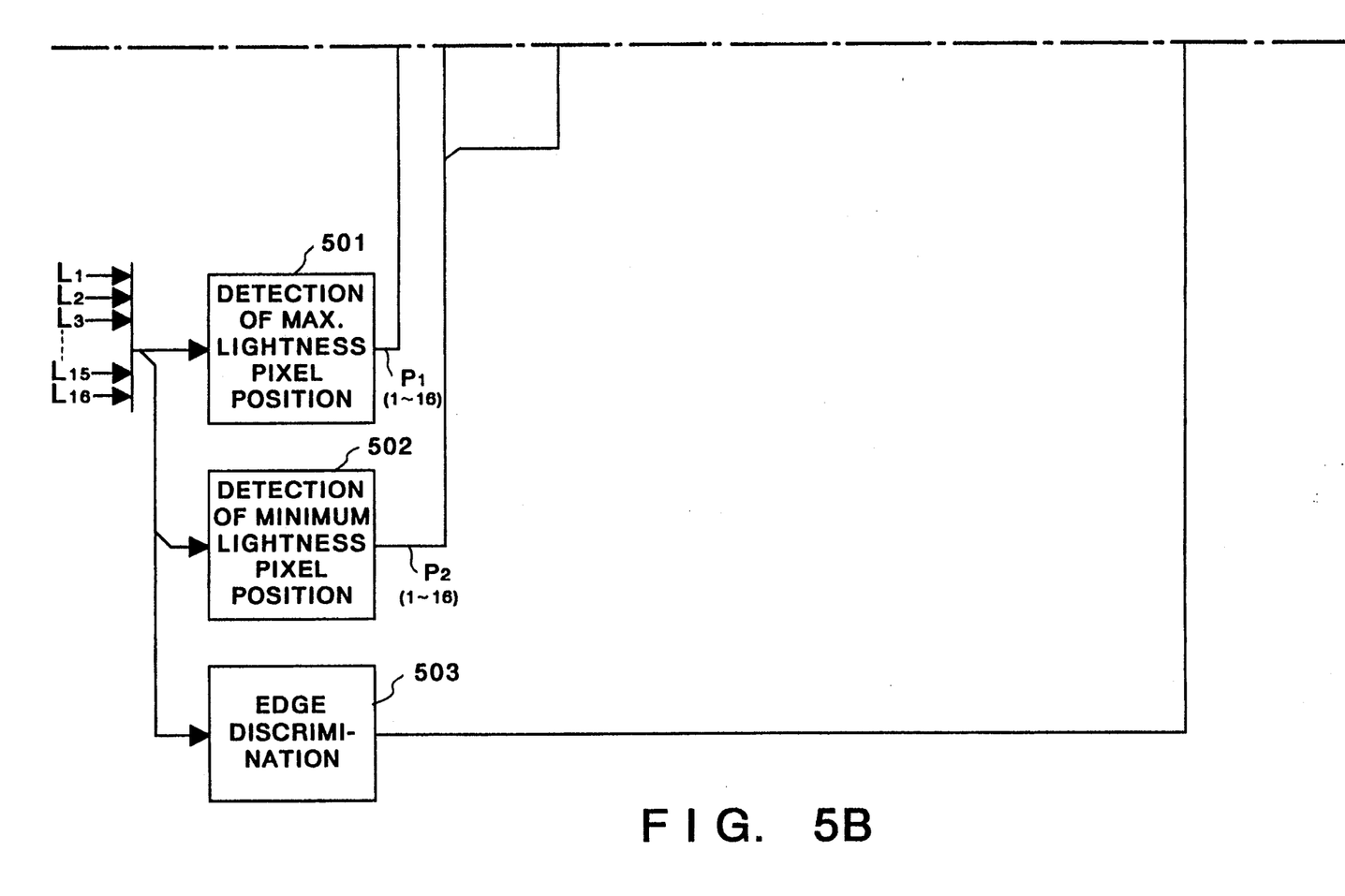

FIGS. 5A and 5B are schematic block diagrams showing the construction of the chromaticity coding device 403. The chromaticity coding device 403 receives lightness data ($L_1$ to $L_{16}$) and chromaticity data ($a_1$ to $a_{16}$), ($b_1$ to $b_{16}$). Numeral 501 designates a maximum lightness position detector which outputs maximum lightness pixel position information $P_1$ (=1 to 16) indicative of the position of the pixel having the highest lightness among the lightness data ($L_1$ to $L_{16}$). Numeral 502 denotes a minimum lightness position detector which outputs minimum lightness pixel position information $P_2$ (=1 to 16) indicative of the position of the pixel having the lowest lightness among the lightness data ($L_1$ to $L_{16}$). An edge discriminating device 503 outputs a logical value "1" when the lightness distribution in the pixel block is flat, whereas, when an edge is included in the pixel block, it outputs a logical value "0". Mean value computing devices 504 and 505 compute the mean values $a^*$, $b^*$ of the chromaticity data blocks ($a_1$ to $a_{16}$), ($b_1$ to $b_{16}$) in accordance with the following formulae.

$$a^* = \frac{1}{16} \sum_{i=1}^{16} a_i$$

$$b^* = \frac{1}{16} \sum_{i=1}^{6} b_i$$

A selector 506 selects the pixel of the maximum lightness in accordance with the above-mentioned maximum lightness position information $P_1$ and outputs the chromaticity data $a_u^*$ of this pixel. On the other hand, the selector 507 selects the pixel of the minimum lightness in accordance with the above-mentioned minimum lightness position data $P_2$ and outputs the chromaticity data $a_1^*$ of this pixel. Similarly, the selector 508 outputs the chromaticity data $b_u^*$ of the maximum lightness pixel and the selector 509 outputs the chromaticity data $b_1^*$ of the minimum lightness pixel.

A ROM 207, upon receipt of mean values ($a^*$, $b^*$) as the address input, synthetically codes these men values so as to produce corresponding ab-code. This operation is for the "flat" block. A ROM 204 receives chromaticity data ($a_u^*$, $a_1^*$) as address input and synthetically codes these data. A ROM 205 receives chromaticity data ($b_u^*$, $b_1^*$) as address input and synthetically codes these data. A ROM 206 receives the outputs from the ROMs 204 and 205 as address input and synthetically codes these outputs, thereby producing the final ab-code. This coding operation is for a pixel block having an edge therein. A selector 510 performs change-over between the output of the ROM 207 and the output of the ROM 206 in accordance with the output from the edge discriminating device 503.

The thus coded image data is temporarily stored in a memory until it is delivered to an output device such as a printer. Since the data stored in the memory is coded data, these data have to be decoded when delivered to the output device. The decoding can be conducted by following a procedure reverse to that in the coding. Namely, coded $L^*$, $a^*$ and $b^*$ signals are converted into R, G and B signals.

A description will now be given of the operation performed when the image data is reduced, with reference to FIG. 1 again. In this embodiment, the reduction of image data is conducted after the image data which has been coded is decoded.

As shown in FIG. 1, coded data $L^*$, $a^*$, $b^*$ temporarily stored in the memory 103 are decoded into R, G and B data 105 and the decided data are synthesized into the original image composed of components of the colors M, C and Y which can be developed by toners. First-order-interpolatin-magnified (reduced) data 107 is then obtained.

In the described embodiment, interpolation magnification (enlargement) is conducted before the coding of the image data, while reduction is conducted after decoding of the image data, so that errors caused by coding and decoding can be minimized.

The embodiment is only illustrative, and various changes and modifications may be imparted thereto.

For instance, although first-order interpolation is used for the interpolation magnification in the described embodiment, the same advantages are brought about when the interpolation magnification is conducted by 0-order interpolation.

More specifically, quantization errors due to coding and decoding are derived from the algorithm alone, so that the errors caused by coding and decoding are enlarged or magnified when the data which has been coded and then decoded is magnified. On the other hand, when an interpolation magnification (reduction) is coding and decoding of a reduced image data causes some portions of the originally contained image data to be neglected or omitted in the course of reduction, so that the coding and decoding are conducted on the image data of reduced quantity, resulting in generation of quantization error.

Therefore, interpolation magnification of 0-order, as well as the interpolation magnification of first order, can reduce the quantization error for any form of algorithm which divides an image into blocks each containing a plurality of pixels and conducts coding and decoding on the block basis.

As will be understood from the foregoing description, according to the present invention, errors caused by coding and decoding can be minimized by virtue of the process in which enlargement of an image data is conducted in advance to coding and decoding of the image data while reduction of the image data is conducted after coding and decoding.

In the above embodiment, the coding method is used for vector quantization. This method is irreversible coding method and the effect of the present invention is especially appeared.

Another irreversible coding method, for example, what is called ADCT (Adaptive Discrete Cosine Transform) is also used as coding method. According to this method, when it performs rough quantization of a high-frequency element in frequency element obtained by the orthogonal conversion for the image data, the above quantization error causes.

In addition, the reversible coding method of the run lengths code, the MH code and the MR code may be used as coding method.

In the above embodiment, the printer of electrophotographic type which forms toner images on the photoreceptor in response to the image data provided to the laser driver has been described. Although, the present invention may be applied to the thermal printer or what is called the bubble jet printer in which the head jetted the ink is used by making use of the film boiling by the heat energy. Of course, the present invention may be applied to the facsimile or the image filling apparatus.

Although the invention has been described through its preferred form, it is to be understood that the described embodiment is only illustrative and various changes and modifications may be imparted thereto without departing from the scope of the invention which is limited solely by the appended claims.

What is claimed is:

1. An image processing apparatus comprising:
   input means for inputting image data;
   image enlarging means for enlarging an image represented by the image data input by said input means; and coding means for coding the image data output from said image enlarging means, wherein said coding means performs information non-preserving type coding and said image enlarging means enlarges the image before coding by said coding means in order to prevent an image represented by the coded image data from deterioration which is caused by the information non-preserving type coding.

2. An image processing apparatus according to claim 1, wherein the image data is color image data.

3. An image processing apparatus according to claim 2, wherein said coding means codes the color image data into codes of a color specification system.

4. An image processing apparatus according to claim 1, wherein said input means comprises an image reader for scanning an original image and generating the image data.

5. An image processing apparatus according to claim 1, wherein the information non-preservation type coding is data quantization.

6. An image processing apparatus comprising:

image enlarging means for enlarging an image represented by image data;

coding means for coding the image data output from said image enlarging means by using information non-preserving type coding;

decoding means for decoding coded image data; and reducing means for reducing in size an image represented by the image data decoded by said decoding means, wherein, when said apparatus enlarges the image, said image enlarging means enlarges the image before coding by said coding means, and when said apparatus reduces the image in size, said reducing means reduces the image after decoding by said decoding means, in order to prevent an image represented by the coded image data from deterioration which is caused by the information non-preserving type coding.

7. An image processing apparatus according to claim 6, wherein the image data is color image data.

8. An image processing apparatus according to claim 7, wherein said coding means codes the color image data into codes of a color specification system.

9. An image processing apparatus according to claim 6, further comprising storage means for storing the image data coded by said coding means, said decoding means decoding the image data read from said storage means.

10. An image processing apparatus according to claim 6, wherein said coding means performs information non-preserving type coding.

11. An image processing apparatus according to claim 10, wherein the information non-preserving type coding is data quantization.

12. An image processing apparatus according to claim 6, further comprising image forming means for forming an image on the image.

13. An image processing apparatus according to claim 12, wherein said image forming means comprises a laser beam printer.

14. An image processing method comprising the steps of:

inputting image data;

enlarging an image represented by the image data; and coding the image data representing an image enlarged in said enlarging step, wherein, in said coding step, information non-preserving type coding is performed, and the enlargement of the image is performed before the coding of the image data in order to prevent an image represented by the coded image data from deterioration which is caused by the information non-preserving type coding.

15. An image processing method comprising the steps of:

enlarging an image represented by image data;

coding image data representing an image enlarged in said enlarging step by using information non-preserving type coding;

decoding coded image data; and reducing in size an image represented by the image data decoded in said decoding step, wherein, when the image is enlarged, the enlargement is performed before coding of the image data, and when the image is reduced in size, the reduction is performed after decoding of the image data, in order to prevent an image represented by the coded image data from deterioration which is caused by the information non-preserving type coding.

* * * * *

UNITED STATES PATENT AND TRADEMARK OFFICE
CERTIFICATE OF CORRECTION

PATENT NO. : 5,355,232
DATED : October 11, 1994
INVENTOR(S) : TATSUHITO KATAOKA

It is certified that error appears in the above-indentified patent and that said Letters Patent is hereby corrected as shown below:

COLUMN 9

Line 20, "non-preservation" should read --non-preserving--.

COLUMN 1

Line 57, "apparatus. Ac-" should read --apparatus. Ac---.

COLUMN 2

Line 51, "b˙" should read --b˙.--.
Line 62, "where" should read --where,--.

COLUMN 4

Line 31, "noncharacter" should read --non-character--.
Line 35, "1220" (second occurrence) should read --1220'''--.

COLUMN 5

Line 12, "on" should read --of--.

COLUMN 6

Line 23, "And" should read --and--.
Line 49, "then" should read --them--.

COLUMN 7

Line 8, "formulae." should read --formulae:--.

UNITED STATES PATENT AND TRADEMARK OFFICE
CERTIFICATE OF CORRECTION

PATENT NO. : 5,355,232
DATED : October 11, 1994
INVENTOR(S) : TATSUHITO KATAOKA

It is certified that error appears in the above-indentified patent and that said Letters Patent is hereby corrected as shown below:

COLUMN 7 (continued)

Line 10, $$\text{"}a^* = \frac{1}{16} \sum_{i=1}^{16} a_i$$

$$b^* = \frac{1}{16} \sum_{i=1}^{6} b_i \text{"} \quad \text{should read}$$

$$-- \overline{a^*} = \frac{1}{16} \sum_{i=1}^{16} a_i$$

$$\overline{b^*} = \frac{1}{16} \sum_{i=1}^{16} b_i \quad --.$$

Line 29, "men" should read --mean--.

Line 61, "order-interpolatin-magnified" should read --order-interpolation-magnified--.

UNITED STATES PATENT AND TRADEMARK OFFICE
CERTIFICATE OF CORRECTION

PATENT NO. : 5,355,232
DATED : October 11, 1994
INVENTOR(S) : TATSUHITO KATAOKA

It is certified that error appears in the above-indentified patent and that said Letters Patent is hereby corrected as shown below:

COLUMN 8

Line 36, "appeared" should read --apparent--.
Line 43, "causes" should read --is caused--.
Line 53, "jetted" should read --jetting--.

Signed and Sealed this

Twenty-fifth Day of April, 1995

Attest:

BRUCE LEHMAN

Attesting Officer          Commissioner of Patents and Trademarks